United States Patent [19]
Carter

[11] Patent Number: 5,376,043
[45] Date of Patent: Dec. 27, 1994

[54] HOLDER FOR VARIOUS ITEMS, INCLUDING, FOR EXAMPLE, A COMBINED CATFISH HOLDER & KILLER

[76] Inventor: William D. Carter, Rte. 6 Box 387, Lucedale, Miss. 39452

[21] Appl. No.: 173,195

[22] Filed: Dec. 22, 1993

[51] Int. Cl.$^5$ .............................................. A22C 25/06
[52] U.S. Cl. ................................... 452/195; 452/196; 452/65
[58] Field of Search ................. 452/195, 196, 185, 65; 269/53, 54, 54.1, 54.5

[56] References Cited

U.S. PATENT DOCUMENTS

| | | | |
|---|---|---|---|
| 1,132,417 | 3/1915 | Alexander | 452/196 |
| 1,216,959 | 2/1917 | DeCamp | 452/196 |
| 1,802,202 | 4/1931 | Doland | 269/54.1 |
| 1,880,526 | 10/1932 | Templeton | 269/54.1 |
| 2,523,736 | 9/1950 | Swetlik | 452/195 |
| 2,741,061 | 4/1956 | Harrison | 452/195 |
| 2,932,849 | 4/1960 | Missman | 452/196 |
| 2,964,784 | 12/1960 | Kesselring | 452/166 |
| 3,203,036 | 8/1965 | Allison | 452/64 |
| 3,447,200 | 6/1969 | Madre | 452/196 |
| 3,717,188 | 1/1973 | Holladay | 452/195 |
| 3,878,586 | 4/1975 | Hoppert et al. | 452/195 |
| 4,127,919 | 12/1978 | Buddecke | 452/196 |
| 4,977,644 | 12/1990 | Evan et al. | 452/195 |

*Primary Examiner*—Willis Little
*Attorney, Agent, or Firm*—C. Emmett Pugh

[57] ABSTRACT

A holder usable to hold various food items, such as ham, chicken, etc., but particularly efficacious as a combined catfish killer and holder for skinning. The device includes a longitudinally extended, base platform (1); an upwardly extended, fish positioning, holding plate (2) at one end of the platform having a "V" shaped opening into which the fish's head is positioned; a killing spike (4) carried by a sleeve (5), which is carried by a laterally extending, "floating" top bar (6) slidingly mounted on the exterior sides of the diverging "V" legs (21); a laterally extended, stop railing (7) provided at the other end of the platform extending below its bottom (11); and a lateral trough (8) across the top (12) of the platform. In use, the head (H) end of the catfish (C) is positioned in the "V" shaped opening, while applying backward pressure on the fish, causing the fish's pectoral fins (F) to rest back against the distal sides of the "V", properly aligning the fish so that, when the top plate (2) is placed down on the "V", the fish's brain is in "perfect" alignment with the spike. The spike is hit with a mallet, and the fish is instantly killed, while the fish is held in triangulated fashion. The raised bottom (22) of the opening causes the part of the fish that is typically cut with a knife to be fully exposed, while also permitting clearance for the use of skinning pliers to pull the catfish's skin off. The fish may also be fileted while restrained in the holder.

16 Claims, 2 Drawing Sheets

HOLDER FOR VARIOUS ITEMS, INCLUDING, FOR EXAMPLE, A COMBINED CATFISH HOLDER & KILLER

TECHNICAL FIELD

The present invention is directed to a holder suitable for holding many different food items, such as, for example, a chicken or other fowl or a ham or the like, but is particularly efficacious in use as a catfish killer and holder for the subsequent skinning of the killed fish.

The killer/holder device of the invention preferably includes a "V" shaped positioner for the fish's head which is located where a fish piercing member or spike will be propelled into the brain of the fish, quickly killing it in preparation for skinning or scaling the fish. The rear or back sides of the fish's pectoral fins are placed right in front of and preferably against the distal side of the "V" positioner, which "automatically" accurately positions the fish's brain under the movement of the pointed spike, which preferably moves under impact in a straight, vertical direction down into the fish's head.

The invention is thus directed to a humane invention that is proven, the preferred embodiment of which includes a vertically aligned "V" shaped opening in a vertically disposed, positioning plate attached to a flat rigid, horizontal base surface, a "floating" or vertically moveable top bar plate that is slidable up and down on the "V" plate and holds the vertically moveable spike located in the center of and in the same plane as the positioning plate. When the fish's pectoral fins are positioned against the distal side of the "V" plate, the spike is positioned to pierce the brain of the catfish, instantly killing it.

BACKGROUND ART

In the general art actually used by most fishermen, catfish are generally directly clubbed with a hammer, which usually just stuns them, and then skinned alive, which to some degree is painful for the fish and very often the person doing the skinning. If the fish is flopping around while being skinned, the pectoral and dorsal fins of the fish can cause a very painful puncture wound to the skinner.

A number of devices for holding a fish for its killing and/or skinning or scaling have been suggested in the prior art. Some prior patents which are considered at least generally pertinent to the invention are listed below:

| U.S. Pat. No. | Inventor(s) | Issue Date |
| --- | --- | --- |
| 1,132,417 | Alexander | 03/16/15 |
| 2,523,736 | Swetlik | 09/26/50 |
| 2,741,061 | Harrison | 04/10/56 |
| 2,932,849 | Missman | 04/19/60 |
| 3,447,200 | Madre | 06/03/69 |
| 3,713,188 | Holladay | 01/30/73 |
| 3,878,586 | Hoppert et al | 04/22/75 |
| 4,127,919 | Buddecke | 12/05/78 |
| 4,977,644 | Evans et al | 12/18/90 |

The most pertinent patent to the present invention appears to be the patent to Buddecke (U.S. Pat. No. 4,127,919) which is directed to a "combined catfish killer and holder". At one end of the device's base board is a squared-off, horizontally "U" shaped positioner 14 into which the fish's head is generally positioned. A spike 18 is thereafter pushed down through the fish's head and once so ". . . safely impaled the catfish is generally killed quickly . . . ." In this action "the spike 18 is caused to enter the head of the fish and in the proper placement is driven through the head of the fish to kill it as efficiently as possible." After the fish is impaled, the fish is skinned and cleaned using a sharp knife.

In comparing the Buddecke device to the invention, the Buddecke squared-off positioner 14 would not nearly as accurately and automatically position the brain of the fish under the path of travel of the spike, as occurs in the invention with its use of a vertically disposed "V" shape holder or other inwardly, downwardly converging shaped holder located preferably in the same plane as the spike's vertical travel, with the backsides of the fish's pectoral fins positioned against the distal side of the holder. This approach of the invention provides a much more accurate positioning of the fish's brain under the spike due to its proximity to the path of spike travel and the use of the fish's adjacent pectoral fins in the positioning step, while the Buddecke positioner, using only the tip of fish's head for relatively loose positioning, does not as accurately take into account the size of the fish and also allows for more inaccurate positioning in the crucial placement of the fish's head with respect to the spike's path of travel, which in Buddecke is arcuate about a hinge pin.

Thus, there are significant differences between the invention and the Buddecke device. Also one very practical, important difference between the invention and the Buddecke approach is that the invention is proven and works, effectively providing "all" catfish with the same precise killing and holding capability, while Buddecke fails in these respects.

As can be seen from a review of the above listed patents, there are a number of other devices that use a spike or other pointed, fish piercing member(s) to affix a fish to a board for killing and/or skinning or scaling it, with each of the above listed patents being directed to one form or another of this approach, some being hand-held while others are carried by the device typically with arcuate movement. With respect to other, exemplary, prior art devices which pierce the head of the fish, note, for example, the patents to Missman (U.S. Pat. No. 2,932,849), Harrison (U.S. Pat. No. 2,741,061) and Madre (U.S. Pat. No. 3,447,200). However, the invention likewise has significant structural and methodological differences over these references, including at least the vertically "V" shaped, three (3) "point" holding/positioning of the fish discussed above with respect to the Buddecke patent and the methodology of use of the invention, including inter alia the placement of the pectoral fins of the fish back against the distal side of the "V" shaped holder for "automatic" placement of the preferred vertically moving spike directly over the brain of the fish.

The present invention is thus directed to overcoming and avoiding the deficiencies of the prior art, and particularly providing enhanced, firm holding of the fish, while also providing automatic positioning of the brain of the fish directly beneath the killing spike.

GENERAL DISCUSSION OF INVENTION

The present invention provides a food item older which includes:
an elongated base,
an upwardly extending member (e.g., a vertical plate) mounted on the base and having an opening with upwardly diverging sides for receiving within it one end of the item to be held (e.g., the head of a fish), and a vertically moveable, laterally extended member (e.g., a top plate slidably mounted on the upwardly extending member) extending across the opening and carrying at least one, item piercing member (e.g., a linearly moveable spike preferably located in the same plane as the two diverging sides), with the underside of the laterally extending member in combination with the diverging sides producing a three "point", triangulated, firm holding of the item within the opening. The preferred configuration of the holding opening is an upwardly extending or vertically disposed "V" shape.

The base preferably includes at the end opposite from the holding plate a downwardly extending railing or stop plate, allowing the base to be placed on a sink, counter, table or other work surface with the lip railing pushed against the side of the work surface with the mid-section of the user preferably pushed against it. This firmly secures the device on the work surface without using ones hand(s) or other supplemental mechanical fasteners.

In the preferred use of the holding device of the invention, the head of a catfish is placed in the "V", while applying backward pressure on the fish, causing the back sides of the pectoral fins to rest back against the distal sides of the "V". This properly aligns and positions the fish so that, when the top plate is placed on the "V", the fish's brain will be in perfect alignment with the spike.

The top of the spike is then hit with, for example, a mallet, and the fish is instantly killed. Additionally, the fish is continued to be held in the firm, three (3) "point", triangulated hold, which makes the remainder of the job (e.g., skinning and fileting) relatively easy and safe.

The top plate is designed so that the area that is cut with a knife is fully exposed, while also permitting clearance for the use of skinning pliers to pull the catfish's skin off.

The fish may then be skinned and fileted while still restrained in the holder.

The spike preferably is completely removable from the top plate for cleaning and can be stored in a separate location from the plate and "V" holder, so that, for example, children can not play with the device and get hurt by the spike.

Thus, a basic object of the present invention is to provide enhanced, firm holding of, for example, a catfish, or other food item, while also providing automatic positioning of the brain of the catfish directly beneath a killing spike.

It is a further object to also provide a holder which allows the holder to be firmly held on, for example, a counter or table without the use of hands or supplemental mechanical means fastening it to a work surface.

It is a still further object of the invention to provide such a device which can be economically made and still be reliable, sturdy, long lasting and easy to use even by a novice.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

CURRENT BEST MODE FOR CARRYING OUT THE INVENTION

Figure 1:
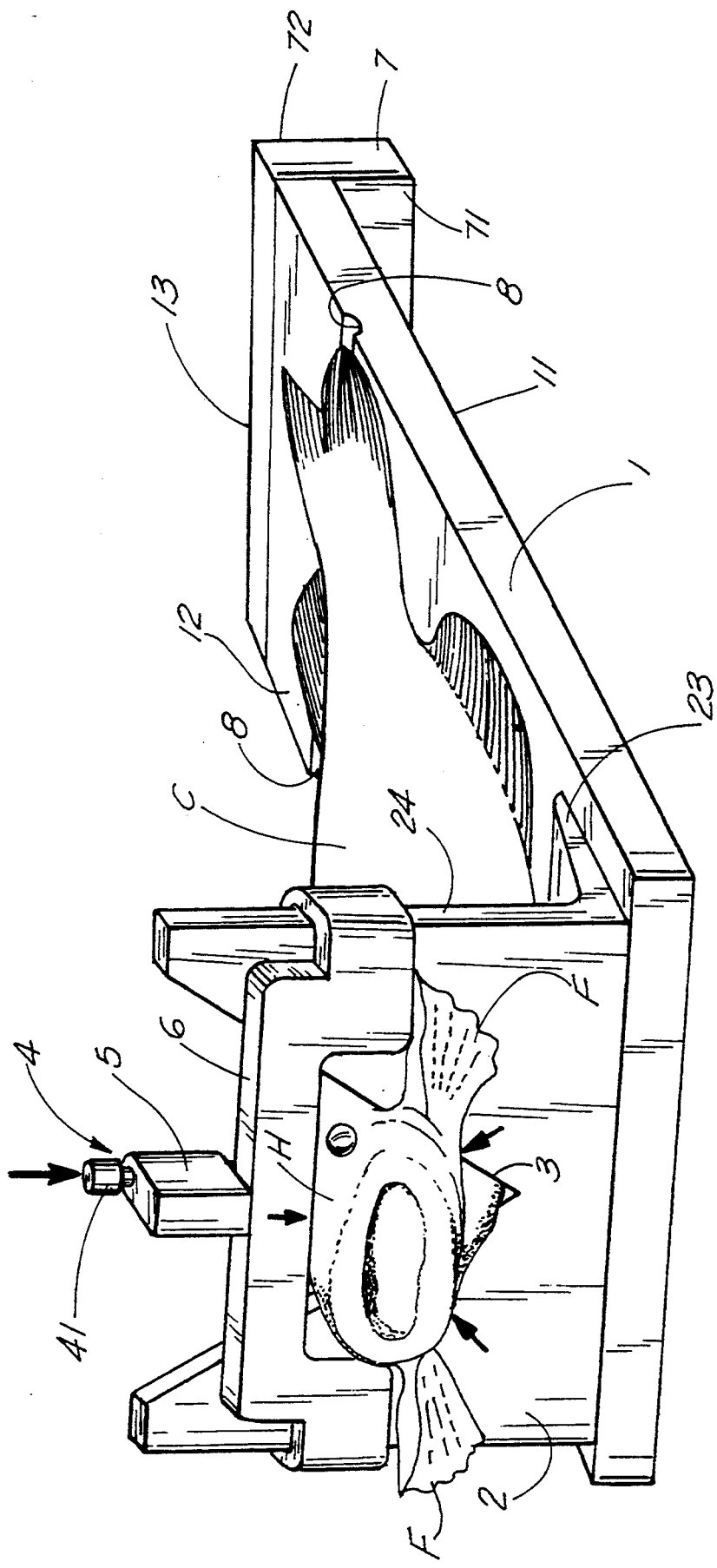
FIG. 1 is front, perspective view of an exemplary, currently preferred embodiment of the holder of the invention, which is particularly useful in positioning a catfish (as illustrated) or the like for its instant killing and thereafter holding it for, for example, its skinning.
Figure 2:
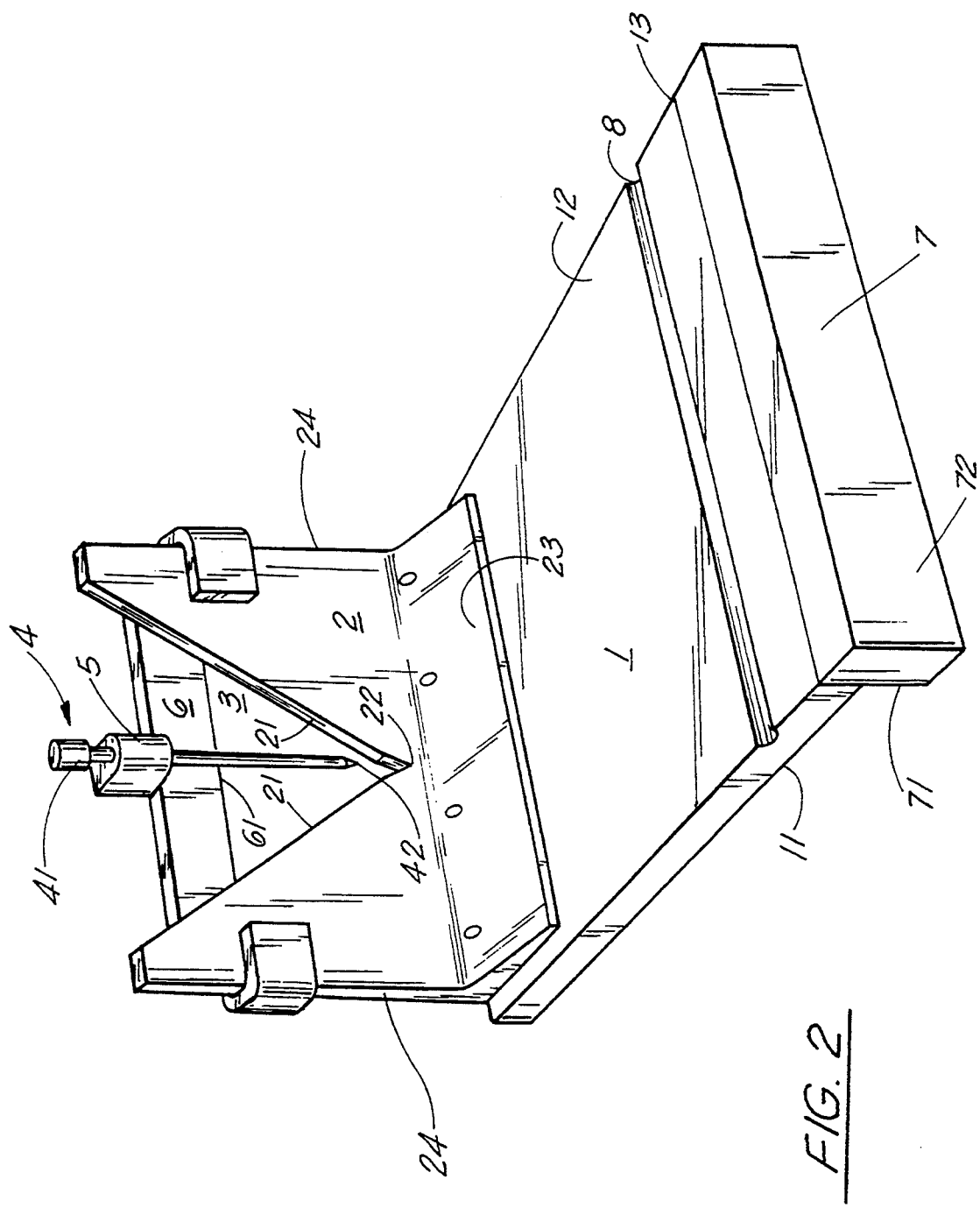
FIG. 2 is a rear, perspective view of the embodiment of FIG. 1, but with the fish removed to more clearly show the structure of the device.

As can be seen in FIGS. 1 and 2, the exemplary, currently preferred embodiment of the holder, particularly useful for holding and killing catfish and the like, comprises a holder which can be used to hold many different items, including, for example, a chicken or other fowl or a ham, etc., but is particularly efficacious as a catfish killer and holder for skinning.

Structure

The holder device includes a longitudinally extended, horizontal, base platform 1; an upwardly extending, fish positioning plate 2 at one, distal end of the platform and including a centrally located, "V" shaped portion or opening 3 into which the fish's head is to be positioned; a vertically moveable, killing spike 4 carried by a centrally located, vertically extended sleeve 5, which in turn is carried by a laterally extended, vertically movable or "floating" bar or top plate 6 slidingly mounted on the straight sides 24 of the diverging legs 21 of the "V" portion. The sleeve 5 positions the spike 4 so that it lies and moves down in substantially the same plane as the diverging sides 21 of the opening 3, which plane is preferably orthogonal to the upper surface 12 of the base 1.

The top plate or bar 6 preferably is separable and removable from the upwardly extending plate 2, and the flat, vertical plate 2 has an integral mounting base 23 for firmly securing or affixing it to the upper side 12 of the base 1 by screws or the like.

As can be seen in the figures, the opening for the fish head or other food item preferably has straight, upwardly diverging, sides, forming a classic "V" shape. However, other shapes for the opening are possible, including, for further example, a diverging "U" or segmented "V" shape with the angle of the sides of the "V" varying, although it is highly desirable that the shape have the upper part of the opening wider than the lower part, thus providing upwardly diverging sides into which the food item can be inserted until its width is the same as the width of the diverging sides.

A straight, laterally extended, "lip" railing 7 is preferably provided at the other, proximal end 13 of the platform base 1 extending below its bottom 11 and having an exposed interior or inner side 71 and an exterior or outer side 72.

A laterally extended trough 8 is preferably included (note FIG. 2) in the upper surface of the platform, extending from side-to-side across the top 12 of the platform 1. The trough 8 catches any drippings (blood, bodily fluids, etc.) from flowing to and off the proximal end 13 of the platform 1, generally preventing any drippings, blood or other fluids from the fish (or other item) from reaching the user, who would normally be located at the proximal end 13 of the device.

The base 1 and railing 7 can be made of, for example, half inch oak planking or of other material, including man-made, which is sufficiently strong and long lasting, preferably providing a good cutting board type upper surface 12. The holding plate 2 and the "floating" top plate 6 can both be made, for example, of metal plate, with the latter being bent into the appropriate shape of a bar having hooked or curved ends for engaging the vertical, straight sides 24 of the plate 2. The spike 4 can be made, for example, of forged or stainless steel, preferably having a sharp pointed end or tip 42. Suitable, exemplary horizontal surface dimensions for the base 1 are, for example, twenty-two inches by ten inches (22″×10″), with the bottom 22 of the "V" shape being, for example, about three-quarters (¾″) of an inch above the top 11 of the base, with the "V" being, for example, seven and a half (7.5″) inches across at its top and seven and a half (7.5″) inches deep to its bottom 22.

Although a single spike 4 is currently preferred, multiple spikes in, for example, a lateral line or laterally and/or longitudinal clustered around and about the plane of the vertical "V" shape may also be used.

Methodology of Use

In the preferred use of the invention, the head H end of a catfish C is positioned down in the "V" shaped opening, with the top plate 6 temporarily removed and with the fish's pectoral fins outboard or ahead of the plate 2, while applying some backward pressure on the fish, until the under or back sides of the fish's pectoral fins F are in juxtaposition to and rest against the distal, exterior sides of the "V" plate 2 and the fish is to some degree wedged down into the opening. This properly aligns the fish so that, when the top plate 6 is replaced and moved down on the "V" until the central part of its underside 61 contacts the top of the fish, the fish's brain will be in "perfect" alignment with the spike 4. It is noted that, when the fish is alive, the pectoral fins F of a catfish stick nearly straight out and can be pulled out if need be.

Once the fish is so positioned, the top or head 41 of the spike 4 is then drivingly hit with, for example, a mallet or other blunt instrument (note large directional arrow in FIG. 1), driving it vertically straight down in a linear movement, and the fish is "instantly" killed. Additionally, the fish is now still being firmly held in a three (3) "point" hold (note smaller directional arrows in FIG. 1) between the three areas 21 & 61, (note FIG. 2) which makes the remaining skinning and fileting part of the job relatively easy and safe.

The vertical plate 2 is designed with the bottom 22 of the "V" shaped opening located up a significant distance from the top 12 of the base 1 so that all of the areas surrounding the fish's head H that typically are cut with a knife in the initial step in skinning the catfish are fully exposed, while also permitting clearance for the use of skinning pliers to pull the catfish's skin off even on the underside of the fish. After skinning, the fish C may then be fileted while still restrained in the three "point", triangulated holder. It should be understood that, because of the flexible nature of the fish's body, the triangulated holding is with some linear area contact and not just at pure, isolated points.

During all of these killing, skinning and fileting steps, the holder device is preferably stabilized by placing the flat bottom 12 of the base 1 unto an appropriate work surface, such as, for example, a sink, a counter top or table top or the like, which has a side, straight edge, with the straight inner side 71 of the lip railing 7 extending past the work surface in contact with the straight side edge of the work surface. Then, by merely pushing against the outer or exterior side 72 of the railing 7, using the user's mid-section, the base is firmly and stably held in place on the work surface without the use of hands or supplemental fastening members. This leaves both of the user's hands free to initially position and kill the fish and thereafter skin and filet it.

When the holder is used to hold a chicken or other fowl, the legs of the chicken are preferably positioned in the "V" shaped opening. In the case of a ham, the smaller end of it preferably is placed in the "V" shaped opening.

While the present invention has been shown and described in what is at this time currently believed to be most the practical and preferred embodiment, it is recognized that departures may be made therefrom within the scope of the invention, which therefore is not to be limited to the details disclosed herein, but it is to be accorded the full scope of the claims as to embrace any and all equivalent devices and approaches.

Thus, the embodiment described herein in detail for exemplary purposes is subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

I claim:

1. A holder for elongated, piercable, food items, comprising:
    an elongated base;
    an upwardly extending member extending upwardly from said base and defining an opening with upwardly diverging sides and having a central portion for receiving within it and contacting and at least partially holding one end of the item to be held; and
    an upwardly and downwardly moveable, laterally extended member extending across the opening including a length extending over the opening's central portion and carrying at least one, elongated, downwardly moveable, item piercing member, said laterally extending member having an underside in its length over the central portion of the opening, said underside of said laterally extending member in combination with said diverging sides producing a three "point", triangulated, firm holding of the item when said laterally extended member is moved down against the item within the opening, said item piercing member being drivable into the item when firmly held within the triangulated, firm holding.

2. The holder of claim 1, wherein:
    said laterally extended member and said item piercing member both move up and down linearly.

3. The holder of claim 2, wherein:
    said diverging sides and said item piercing member lie in substantially the same plane which is orthogonal to said elongated base.

4. The holder of claim 1, wherein:
    said laterally extended member includes a vertically extended sleeve in which said item piercing member is carried for linear movement.

5. The holder of claim 4, wherein:
    said diverging sides and said item piercing member lie in substantially the same plane.

6. The holder of claim 1, wherein:
said laterally extended member is carried by said upwardly extended member for linear, planar movement in a plane orthogonal to said base and includes a vertically extended sleeve in which said item piercing member in the form of a spike is carried for linear movement along a vertical line.

7. The holder of claim 1, wherein:
said upwardly extended member is a flat platmounted at one end of said base and has straight, vertically extended sides with a centrally located "V" shaped opening.

8. The holder of claim 7, wherein:
said laterally extended member is a laterally extended bar having hooked ends engaging said vertically extended sides allowing sliding movement of said bar up and down along said sides.

9. The holder of claim 8, wherein:
said bar includes at its center a vertically extended sleeve carrying said item piercing member, which is in the form of a spike having a head suitable for being struck by a blunt instrument.

10. The holder of claim 1, wherein:
said base has a flat bottom and includes at an end opposite to said upwardly extending member a laterally disposed, stop railing extending down below the bottom of said base, allowing said bottom of said base to be placed on a work surface having an edge, with said stop railing pushed against the work surface edge, holding it in position on the work surface.

11. A method for killing a catfish prior to skinning, comprising the following steps:
a) providing a holder for the catfish having
an elongated base;
an upwardly extending member extending upwardly from said base and defining an opening with upwardly diverging sides and having a central portion for receiving within it and contacting and at least partially holding the head end of the catfish; and
an upwardly and downwardly moveable, laterally extended member extending across the opening including a length extending over the opening's central portion and carrying at least one, elongated, downwardly moveable, catfish piercing member, said laterally extended member having an underside in its length over the central portion of the opening, said underside of said laterally extending member in combination with said diverging sides producing a three "point", triangulated, holding area for firmly holding the catfish when said laterally extended member is moved down against the catfish within the opening, said catfish piercing member being drivable into the catfish when firmly held within the triangulated, holding area;
b) positioning the head of the catfish into the opening with the back sides of its pectoral fins in juxtaposition to the distal side of said upwardly extending member;
c) placing the underside of said laterally extending member down in contact with the top of the fish; and
d) driving the catfish piercing member into the fish's brain area, killing the fish.

12. The method of claim 11, wherein there is included the further step of:
skinning the catfish after it has been killed while the catfish is still firmly held in said triangulated, holding area.

13. The method of claim 11, wherein said upwardly extending member is located at one end of said elongated base and there is included a laterally disposed, stop railing extending down below the bottom of the base, allowing said bottom of said base to be placed on a work surface having an edge, with said stop railing pushed against the work surface edge, holding it in position on the work surface, and wherein there is included the further step of:
placing said base on the work surface with said stop railing against said edge; and
pushing against the exterior side of said railing pushing it against said edge, firmly stabilizing the holder on the work surface.

14. The method of claim 11, wherein there is included the further step of:
driving the fish piercing member in a linear, straight line movement into the fish's head.

15. The method of claim 14, wherein said fish piercing member is in the form of a spike having an upper head and a lower, sharp point, and wherein there is included the further step of:
striking the upper head of the spike with a blunt instrument, driving the sharp point into the fish's head.

16. The method of claim 11, wherein said laterally extending member is carried by but separable from said upwardly extending member, and wherein there is included the further step of:
removing said laterally extending member from said upwardly extended member before the fish's head is placed in the opening; and
thereafter replacing said laterally extended member onto said upwardly extending member and moving it downward on said upwardly extending member until its underside is in contact with the head of the fish before piercing the fish with the fish piercing member.

* * * * *